April 26, 1960  K. R. PARTINGTON  2,934,324
HEAT EXCHANGE AND CONTROL THEREFOR
Filed Feb. 7, 1957  6 Sheets-Sheet 1

INVENTOR.
Kenneth R. Partington
BY
HIS ATTORNEY

INVENTOR.
Kenneth R. Partington
BY Edwin S. Dybvig
HIS ATTORNEY

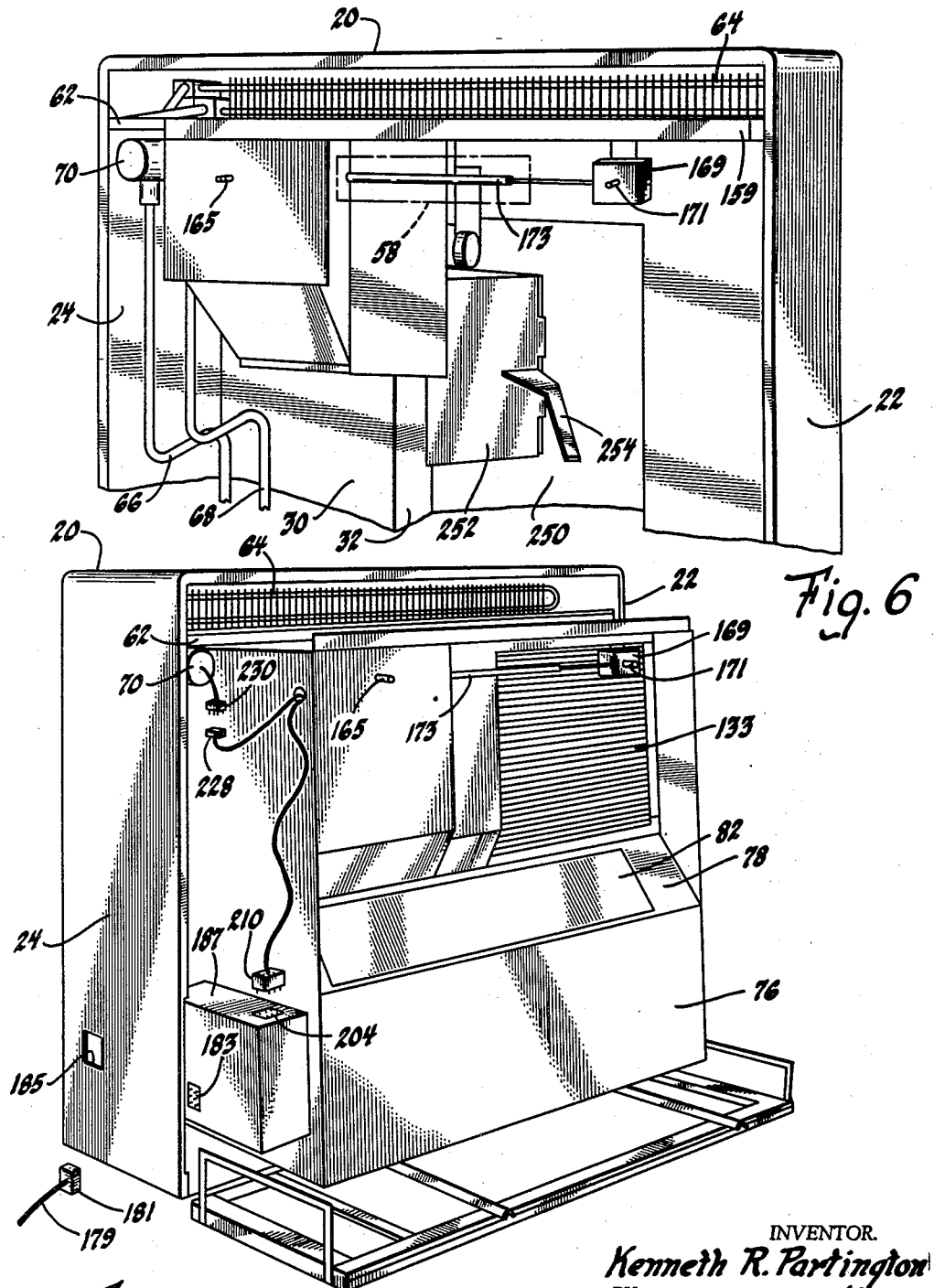

| FUNCTION | SHAFT POSITION | 1 | 2 | 3 | 4 | 5 |
|---|---|---|---|---|---|---|
| HEAT | 0° | ON | OFF | ON | OFF | OFF |
| OFF | CLOCKWISE 45° | OFF | OFF | OFF | OFF | OFF |
| FRESH AIR | CLOCKWISE 90° | OFF | OFF | OFF | OFF | ON |
| EXHAUST | CLOCKWISE 135° | OFF | ON | OFF | OFF | OFF |
| COOLING | CLOCKWISE 180° | OFF | ON | OFF | ON | ON |

INVENTOR.
Kenneth R. Partington
BY Edwin S. Dybvig
HIS ATTORNEY

United States Patent Office 2,934,324
Patented Apr. 26, 1960

2,934,324

HEAT EXCHANGE AND CONTROL THEREFOR

Kenneth R. Partington, Dayton, Ohio, assignor to General Motors Corporation, Detroit, Mich., a corporation of Delaware Application February 7, 1957, Serial No. 638,744

1 Claim. (Cl. 257—313)

This invention relates to refrigerating apparatus and more particularly to air conditioning apparatus for heating and/or cooling a room or rooms.

The manufacturer of air conditioning apparatus is often required by sales demands to provide heating apparatus, cooling apparatus, and combined heating and cooling apparatus for every different general type and size of application. Frequently, after buying either heating or cooling apparatus, many purchasers desire to convert to combined heating and cooling.

It is an object of this invention to simplify the construction, manufacture, selling and repair of heating, cooling, and combined heating and cooling apparatus.

It is another object of this invention to provide a cabinet, components and control system readily adaptable in manufacturing, selling and remodeling to heating or cooling or combined heating and cooling.

It is another object of this invention to provide a combined heating and cooling apparatus in which either heating or cooling components may be removed for repairing or replacement without rendering the other component inoperative.

These and other objects are attained in the form shown in the drawings in which a box-shaped sheet metal console type of cabinet has a projecting sleeve at the rear, of such a width as to fit between the conventional studding of a house and extend through the wall to the outside for communication with the outside air. The cabinet is provided with a removable front providing access to all the apparatus. The refrigerating apparatus is provided with rollers which roll of tracks in the bottom of the cabinet for removal onto aligned tracks which are provided on a carrier. The heating apparatus is located above the refrigerating apparatus so that it is not interfered with by the removal of the refrigerating apparatus. The fan unit which circulates the air from the room through the apparatus can be attached to either the heating or the cooling apparatus so that if either is removed, it is capable of continuing the air circulation for the other apparatus.

The front of the cabinet is provided with a bleeder air passage which assures thermostatic control according to the temperature of the room even though fresh air from the outside is being drawn through the apparatus and discharged into the room. The electrical system is provided with suitable plug connections so that either the refrigerating apparatus, the heating apparatus or the room air fan unit may be disconnected from each other for removal of any one of the components and can readily be reconnected to provide a suitable power supply for the remainder. The condensate from the evaporating unit as well as rain are taken by the fan and discharged onto the condenser, thus providing evaporative cooling of the condenser and the vaporization of the condensate and rain. An overflow drain is also provided.

Further objects and advantages of the present invention will be apparent from the following description, reference being had to the accompanying drawings, wherein a preferred form of the present invention is clearly shown.

In the drawings:

Figure 5 is a perspective view of the apparatus showing the front removed and the refrigerating apparatus and indoor air fan partially removed from the remainder of the cabinet;

Figure 6 shows the apparatus with the front and the refrigerating apparatus removed but containing the indoor air fan unit and the heating unit together with a suitable outside closure with an adjustable door to provide fresh air for heating;

Figure 1:
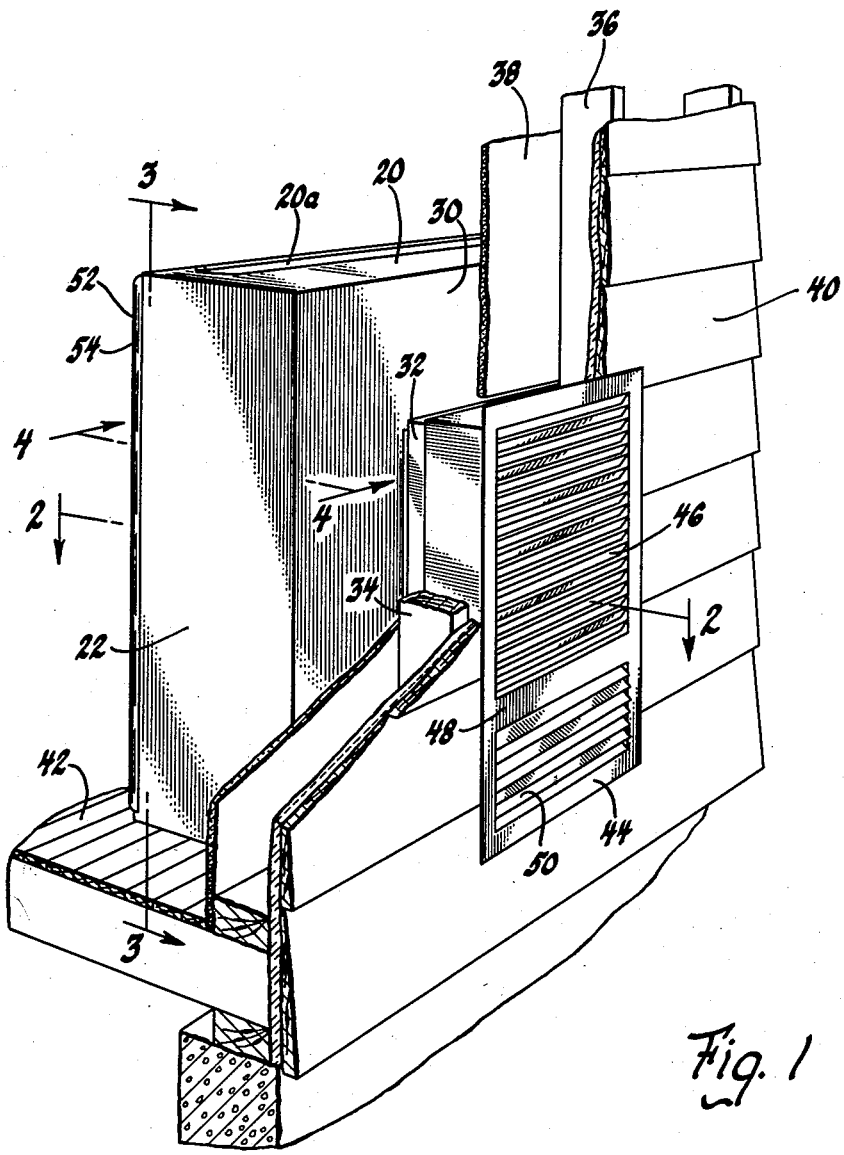
Figure 1 is a fragmentary perspective view showing an air conditioning apparatus embodying my invention installed within and through a wall of a room.
Figure 2:
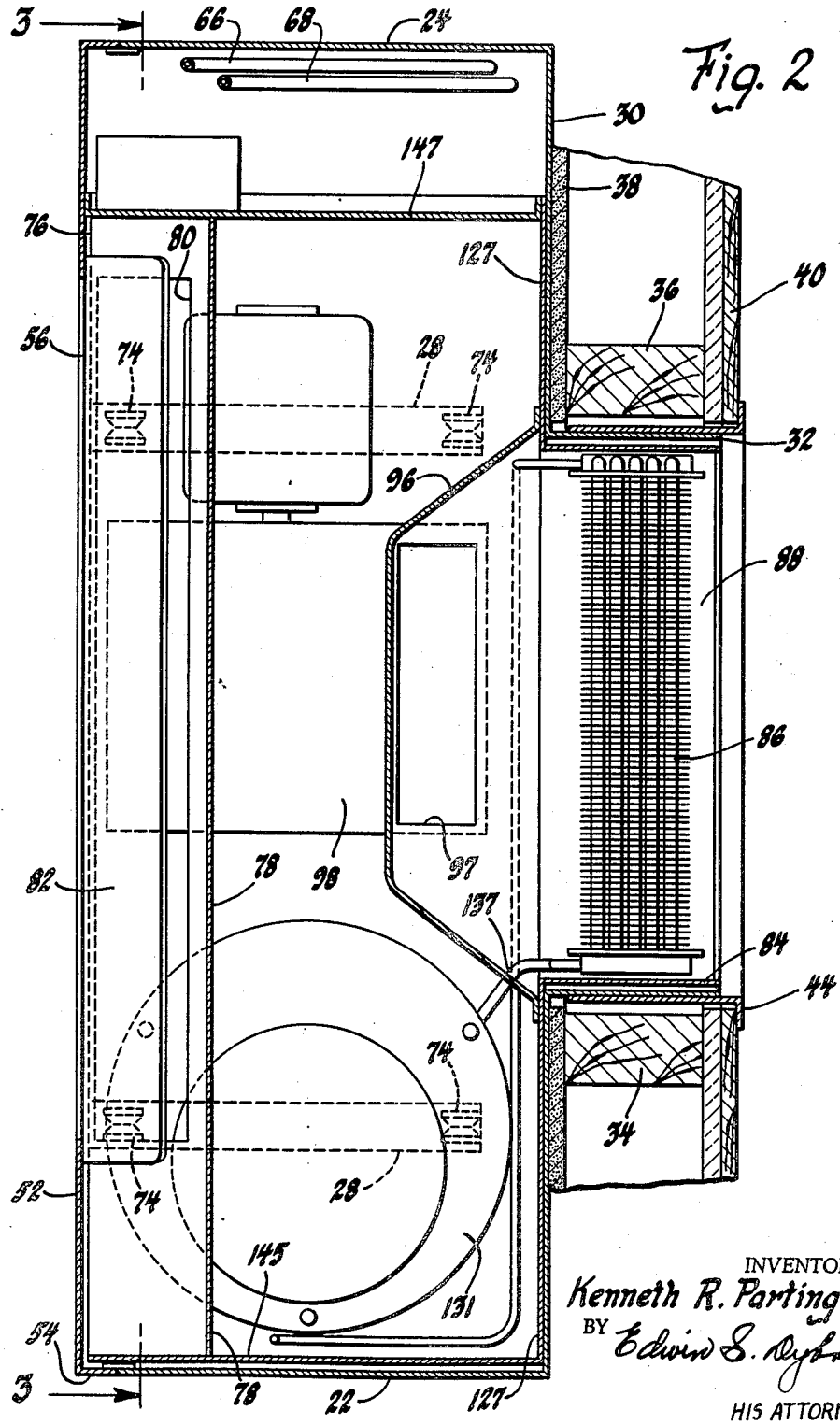
Figure 2 is a horizontal sectional view taken along the lines 2—2 of Figures 1 and 3.
Figure 3:
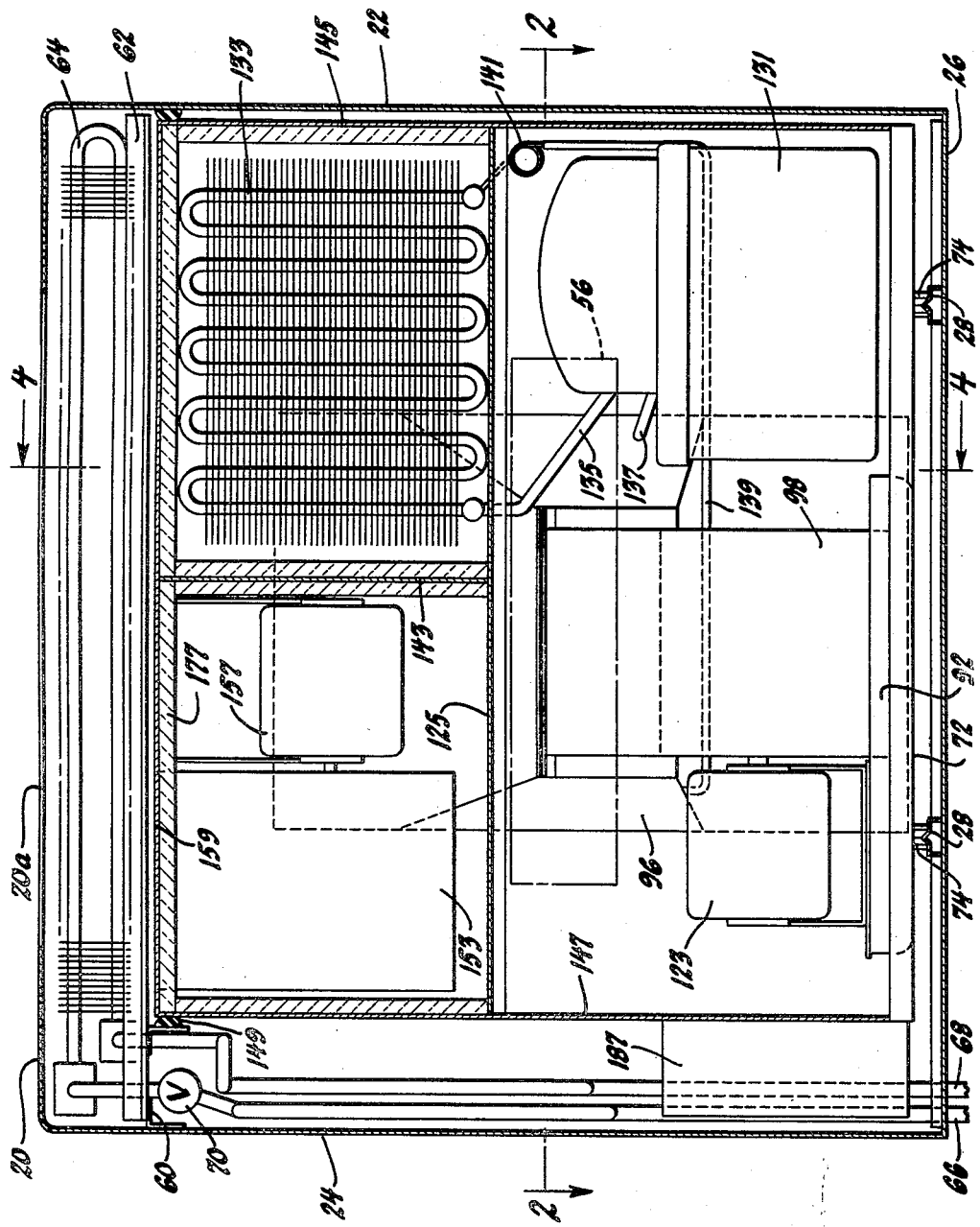
Figure 3 is a vertical sectional view taken along the lines 3—3 of Figures 1 and 2.
Figure 4:
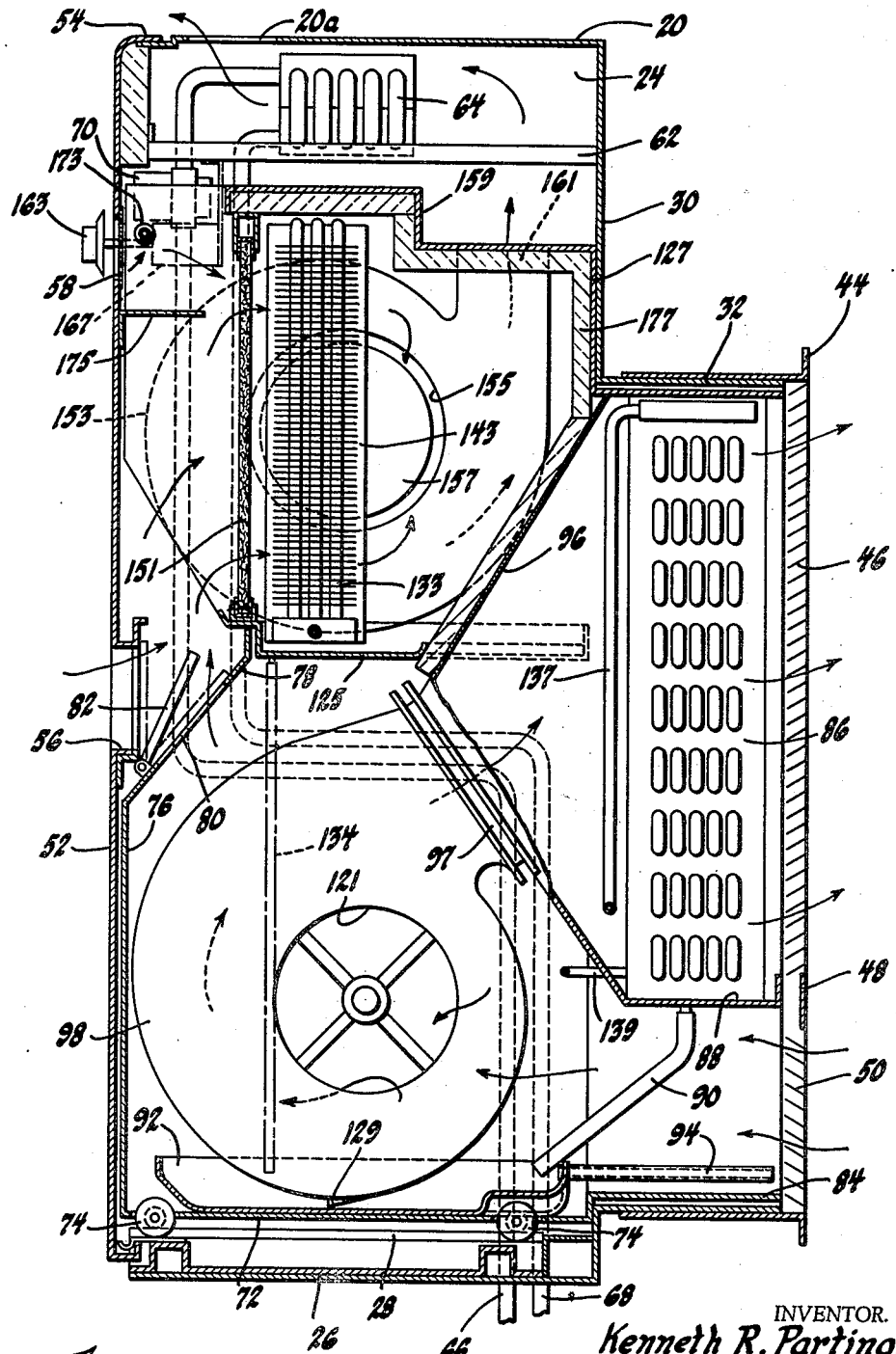
Figure 4 is a vertical sectional view taken along the lines 4—4 of Figures 1 and 3.

Referring now to the drawings, there is shown a cabinet of generally rectangular or box shape containing a one-piece member providing a top wall 20 and side walls 22 and 24. The side walls 22 and 24 are fastened to the bottom wall 26 having transverse reinforcements supporting the guide rails 28 extending from the front to the rear of the base 26. Also fastened to the top, bottom and side walls is the rear wall 30 having a rectangular tubular extension 32 sufficiently narrow to fit between the studs 34 and 36, of standard spacing and sufficiently long to extend through the wall from the inside plaster 38 to the outside weatherboarding 40, both of which are supported by the studs of standard size and spacing. The cabinet is adapted to rest upon the floor 42 against the plaster wall 38. The outer end of the tubular extension 32 is provided with a suitable flange 44 primarily for the purpose of concealing the edges of the opening in the wall. It may be combined with a suitable grill formed of upwardly extending louvers 46 in the upper portion and providing a discharge opening above the dividing strip 48 and a set of downwardly directed discharge louvers 50 beneath the strip 48.

The cabinet is also provided with a removable front wall 52 having curled top and side edges 54 which normally overlap the front edges of the top and side walls. Extending across the middle of this front is a flanged room air inlet opening 56 and in its upper central portion is a perforated bleeder air grill 58. Extending from side to side in the top wall 20 is a discharge air outlet 20a.

The side walls 22 and 24 are provided with brackets 60 removably supporting the transverse horizontal baffle 62 adjacent to and spaced from the top wall 20 of the cabinet. The heating unit 64 extends from end to end between the baffle 62 and the top wall 20. This baffle 62 is provided with an opening at the rear for allowing air flow from the compartment beneath to the rear base of the heating unit 64. The heating unit is provided with supply and return conduits 66 and 68 which may connect to a steam or hot water heating system. The supply conduit 66 is provided with a solenoid valve 70 for controlling the supply of heat to the heating unit 64. The supply and return conduits are located adjacent the side wall 24 so that they will not interfere with the removal of the refrigerating apparatus. There is sufficient space at the top and one side of the refrigerating apparatus for the withdrawal of the heating unit 64, the conduits 66 and 68 and the valve 70.

The refrigerating apparatus includes a base 72 provided with four rollers 74 arranged in two pairs to ride upon the pair of tracks 28 in the base 26 of the cabinet. An inner front wall 76 extends upwardly from the base 72 of the refrigerating apparatus and has an inclined upper upward and rearward extension 78 provided with a large laterally extending aperture 80. Hinged to the lower portion of the extension 78 is a door 82 large enough to cover the opening 80. The door 82 is also located so that it will seat against the opening 56 in the front wall. The door 82 has sufficient friction that it will stay in any position to which it is moved, and can close either the opening 80 or the opening 56 or it may assume any intermediate position to provide any proportion of air flow through either of the openings 56 or 80.

The refrigerating apparatus has a rearwardly extending rectangular sleeve 84 which projects into the sleeve 32. Located in the upper portion of this extension 84 is the refrigerant condenser 86 provided at the bottom with a sump 88 having a drain tube 90 draining into the catch basin 92 provided upon the base 72. The catch basin 92 also has an overflow drain 94 extending substantially to the grill 50 so that excessive water therein may flow readily to the outside. A shroud 96 is provided on the inner face of the condenser 86 and connects to the discharge outlet 97 of a squirrel-cage type of centrifugal fan 98 having axial inlet openings 121 on its opposite sides. It is driven by the electric motor 123.

A horizontal baffle 125 extends between the shroud 96 and the adjacent portions of the rear wall 127 of the apparatus to the upper edge of the angular portion 78. This completes the enclosure for the outside air compartment, providing communication between the lower grill 50 and the inlets 121 of the fan 98 and also provides air flow to the opening 80. The air drawn in through the grill 50 is discharged by fan 98 through the outlet 97 and the shroud 96 and forced through the condenser 86 and the grill 46 to the outside to keep the condenser cool. The downwardly directed louvers 50 and the upwardly directed louvers 46 serve to prevent the intermixture of the discharge air with the incoming air. If there should be rain, it may come in through the louvers 46 but this will be helpful to the condenser 46 if it is operating on the refrigerating cycle since it will help to cool the condenser. Any excess will be taken care of by the sump 88, the drain tube 90, the catch basin 92 and the overflow pipe 94. The fan 98 has a bottom inlet 129 from the catch basin 92 whereby the air in its centrifuging action within the fan aspirates or flings the water into the circulating air for discharge onto the surfaces of the condenser 86. This will normally keep the water level in the catch basin 92 below the level of the overflow pipe 94.

Upon the opposite side of the fan 98 from the motor 123, the base 72 also supports a sealed motor-compressor unit 131 adapted to draw evaporated refrigerant from the evaporator 133 through the suction conduit 135 and to discharge compressed refrigerant through the discharge conduit 137 to the top of the condenser 86 for condensing the refrigerant. The condensed refrigerant is withdrawn from the bottom of the condenser 86 through the liquid line 139 which connects to a suitable coiled restrictor tube 141 connected to the inlet of the evaporator 133 for controlling the flow of refrigerant to the evaporator 133. Normally, moisture will condense upon the evaporator 133 and flow from the baffle 125 through the rubber tube 134 into the catch basin 92, thus providing a substantially continuous water supply for the catch basin 92 to be discharged onto the condenser 86 which will accomplish its evaporation along with the discharge of the condensed air into the outside atmosphere.

The evaporator 133 is located between the vertical partition wall 143 and the inner end wall 145 of the chassis of the refrigerating apparatus. The chassis of the refrigerating apparatus also includes an opposed inner end wall 147 which cooperates with an air seal 149 provided upon a downwardly extending angle piece extending downwardly from the baffle 62. In front of the evaporator 133 is a filter 151. Upon the opposite side of the partition 143 is the room air fan 153 also of the centrifugal squirrel-cage type having inlets 155 on both sides and driven by the electric motor 157. The vertical partition wall 143 forces the air from the openings 56 and 82 to flow upwardly and thence rearwardly through the filter and the evaporator 133 before it can pass around the rear edge of the wall or partition 143 to flow into the inlets 155 of the fan.

The fan 153 and its motor 157 are fastened to a top baffle or partition wall 159 arranged in a step shape with the highest portion located over the filter 151 and the evaporator 133 directly beneath the heater 64. This baffle 159 is provided with an opening 161 registering with and connecting directly with the discharge outlet of the fan 153. The lower rear portion of the baffle or partition 159 provides adequate distribution space at the rear of the heater 64 so that the air is substantially uniformly distributed in its flow through the wide heater 64.

Figures 7, 8:
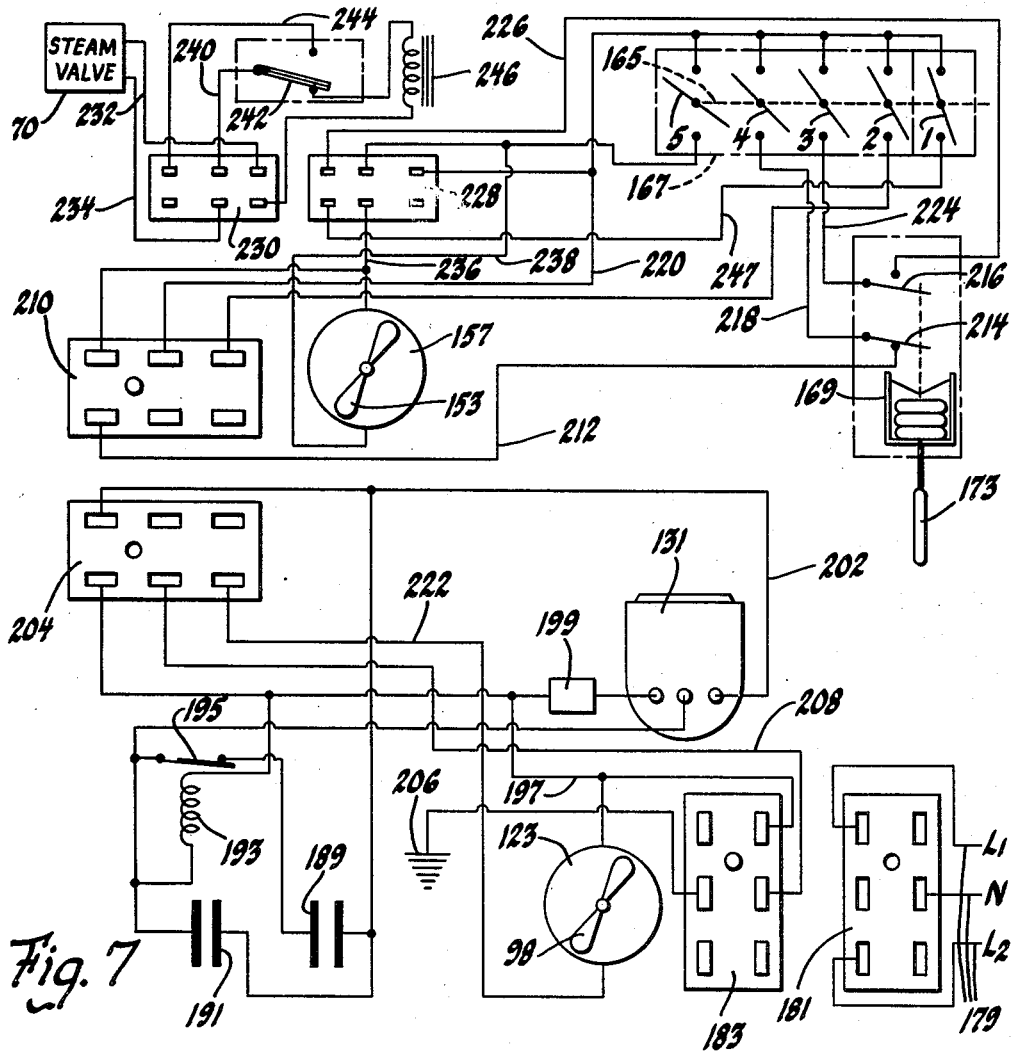
Figure 7 is a wiring diagram of the apparatus.
Figure 8 is a control chart for the multi-position control switch.

The apparatus is controlled by a multi-position switch 167 actuated by the knob 163 on shaft 165. This selector switch 167 provides a position for heat together with a position for refrigeration. In either of these positions fresh air with or without exhausting air can be obtained by the proper position of the door 82. The selector switch 167 as shown by Fig. 8 also has positions for fresh air operating only the motor 157 and fan 153 without cooling or heating and a position for exhaust air operating only the motor 123 and fan 98 without cooling or heating. Also there is a thermostatic control 169 provided with an adjusting shaft 171 adapted to have a knob similar to the knob 163 provided thereon on the outside of the removable front wall 52 which is pierced to receive the two control shafts 165 and 171. The thermostat switch 169 is provided with a connection to the thermostat bulb 173 which is supported directly behind the bleeder air inlet grill 58 above the rearwardly extending deflector 175 provided for shielding the bulb 173 from the upwardly flowing air from the openings 56 and 80. This prevents the thermostat 173 from being responsive to the outside air when the door 82 uncovers the fresh outdoor air inlet opening 80. Thus, the bulb 173 will at all times be responsive to the temperature of the air in the room. The rear walls of the compartment containing the evaporator 133 are lined with a layer of insulation 177 to prevent heat transfer from the outside air.

The electrical connections are particularly shown in Figs. 5 and 7 and include a three-wire single phase supply conductor 179 providing supply conductors $L_1$, $L_2$, and N connecting to three terminals of the socket 181. The socket 181 is adapted to connect to the plug 183 through an opening 185 in the side wall 24. The plug 183 is located on the side wall of a control box 187 containing a starting capacitor 189, a running capacitor 191 and a voltage relay 193 which opens the starting switch 195 at the end of the compressor starting period. One terminal of these starting controls connects to the center terminal of the sealed motor-compressor unit 131. One terminal of the plug connects through the conductor 197 to the motor 123 of the fan 98 illustrated diagrammatically in Fig. 7 as a propeller. This conductor 197 connects through an overload control 199 to the left terminal of the sealed unit. The right terminal of the sealed unit 131 connects through the conductor 202 to the capacitors 191 and 189 as well as to the socket 204 located on top of the control box 187. The conductor 197 also connects to the socket 204 and also to one terminal of the solenoid 193. Another terminal of the plug 183 connects to the ground 296 while still another terminal is connected by the conductor 208 to another terminal on the socket 204.

The socket 204 is adapted to receive a plug connector 210 having one terminal connected by the conductor 212 to the thermostat switch 169 having two alternately opening and closing switches 214 and 216 for cooling and heating respectively connected to the conductors 212 and 226. During cooling, the switch 214 connects the conductor 212 to the conductor 218 connecting with switch 4 of the selector switch 167. This switch 4 connects to a common conductor 220 connecting all the switches of the selector switch 167 to one of the terminals of the plug 210. The plug and socket 210 and 204 connect the conductor 220 to the conductor 208.

The conductor 220 also connects through the switch 3 to the selector switch 167 and the conductor 224 to the switch 216 which connects through a conductor 226 to one terminal of the socket 228. This socket 228 is adapted to receive the plug 230 having a terminal connecting the conductor 226 with the conductor 232 connecting with the steam valve 70. The steam valve 70 also connects to a second conductor 234 connecting with the plug 230. The plug and socket 230 and 228 provide a connection from the condutor 234 to the conductor 236, providing connections with the room air fan motor 123 and the plug 210. The room air fan motor 123 also connects through the conductor 238 to the switch 5 of the selector switch 167 and also to the socket 228.

The switch 5 of the selector switch 167 connects to the conductor 220. The socket 228 and the plug 230 connect the conductor 238 to the conductor 240 connecting with the temperature responsive double-throw switch 242. The switch 242, in its heated position, is adapted to connect to the conductor 244 connecting with another terminal on the socket 230 providing a connection with a corresponding terminal in the socket 228 to connect to the conductor 220. The switch 242 is located in thermal exchange relation with the heating unit 64. It has a cold position for reduced speed operation of the motor 157 and the fan 153 connecting the conductor 240 to the choke coil or impedance 246 likewise connecting to another terminal on the plug 230 connecting through the socket 228 to the conductor 247 connecting with the switch 1 of the selector switch 167. This switch 1 connects to the conductor 220.

It will be seen that the circuit and system extending between the plug 183 and the socket 204 contains the sealed motor-compressor unit 131 and the room air fan motor 123 together with the starting and overload controls for the sealed unit. It is entirely separate from the supply conductor 179 and its socket 181 and it is also separate from the remaining electrical circuits shown in Fig. 7. It will also be seen that there is a separate electrical system and circuits extending between the plug 210 and the socket 228 and including the fan motor 123, the thermostat 169 and the selector switch 167. Finally, there is a third electrical circuit and system including the plug 230, the choke coil 246, the double-throw thermostatically operated switch 242 and the steam valve 70.

The circuit extending between the plug 183 and the socket 204 is connected to the lower portion of the refrigerating chassis. The system extending between the plug 210 and the socket 228 is connected to the baffle 159 which is removable from the top of the refrigerating chassis and can be connected to the baffle 62 as shown in Fig. 6 when the refrigerating system is removed in the manner illustrated in Fig. 5. The electrical circuit and system connected to the plug 230 is connected to the baffle 62. By reason of this arrangement of separating the circuits into three different circuit sections between the plugs and the sockets, the refrigerating chassis may be readily removed by removing the socket 181 from the plug 183. Thereafter, the plug 210 may be removed from the socket 204 and the baffle 159 together with the fan 153 may be disconnected from the refrigeration chassis and connected to the baffle 62, as shown in Fig. 6. The socket 181 is then directly connected to the plug 210 to supply the power and control to the motor 123, the thermostat 169, the selector switch 167, the double-throw switch 242, the choke coil 246 and the steam valve 70. This makes possible the operation of the heating unit 64 when the refrigerating chassis is removed. When the refrigerating chassis is removed, it is replaced by a board 235 completely closing the upper and lower louvers 46 and 50. To provide a fresh air control when the refrigerating chassis is removed, the board 250 is provided with a vertically hinged door 252 provided with an operating arm 254 extending to the room air inlet opening 56. The door may be operated through the opening 56 by moving the arm 254 laterally to any desired position.

It should also be noted that the heating system may be removed by removing the heating unit 64 together with the circuit connected to the plug 230 and the steam valve 70 without interfering with the operation of the refrigerating system and both fans. In this way the unit can be readily manufactured either as a room air cooling unit or as a room air heating unit or a combined room air cooling and heating unit by including only the subassemblies desired. Also, the unit may be readily remodeled in the field or one or the other units of the combined heating and cooling unit may be removed while the other unit may be arranged to continue its operation. This provides flexibility in manufacture and service, thus making the unit economical in first cost even though it be not manufactured in large quantities.

While the form of embodiment of the invention as herein disclosed constitutes a preferred form, it is to be understood that other forms might be adopted, as may come within the scope of the claim which follows.

What is claimed is as follows:

Air conditioning apparatus for tempering the air in a room including a cabinet having a front wall provided with a room air inlet opening, a laterally extending partition substantially meeting said front wall beneath said inlet opening, said cabinet having means communicating with the air outside the room in communication with the space beneath said partition, said partition having an inlet opening adjacent the front wall, alternate opening and closing damper means cooperating with and movable alternately toward closing said openings for proportioning the flow of air through said inlet openings, said cabinet having a discharge opening to the room, an air tempering means located above said partition in said cabinet for tempering air between said damper means and said discharge opening, means for moving air from said inlets through said air tempering means to said discharge opening, said cabinet having a bleeder air inlet opening in the front wall above said partition, a thermostat control for said air tempering means including a thermosensitive element located in said cabinet adjacent said bleeder air inlet opening, and a shield extending beneath said bleeder air inlet opening and said thermosensitive element for shielding said thermosensitive element and said bleeder air inlet opening from the air drawn through said inlet opening in said partition wall, said means for moving the air having its suction side communicating with said bleeder air inlet opening to draw air through said bleeder air inlet opening into contact with said thermosensitive element.

References Cited in the file of this patent

UNITED STATES PATENTS

| | | |
|---|---|---|
| 1,935,305 | West | Nov. 14, 1933 |
| 2,265,272 | Ditzler | Dec. 9, 1941 |
| 2,282,373 | Minkler et al. | May 12, 1942 |
| 2,292,562 | Huggins | Aug. 11, 1942 |
| 2,319,062 | Holmes | May 11, 1943 |
| 2,363,974 | Kirkpatrick | Nov. 28, 1944 |
| 2,692,759 | Swenson et al. | Oct. 16, 1954 |
| 2,773,676 | Boyle et al. | Dec. 11, 1956 |
| 2,857,747 | Mac Crachen et al. | Nov. 28, 1958 |